United States Patent
Baek et al.

(10) Patent No.: US 10,841,656 B2
(45) Date of Patent: Nov. 17, 2020

(54) ELECTRONIC APPARATUS AND CONTROLLING METHOD THEREOF

(71) Applicant: SAMSUNG ELECTRONICS CO., LTD., Suwon-si (KR)

(72) Inventors: Gurnki Baek, Suwon-si (KR); Jongwon Kwak, Suwon-si (KR); Daewoong Kim, Suwon-si (KR); Gilho Park, Suwon-si (KR); Youngjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/396,214

(22) Filed: Apr. 26, 2019

(65) Prior Publication Data

US 2019/0349638 A1 Nov. 14, 2019

(30) Foreign Application Priority Data

May 11, 2018 (KR) .......................... 10-2018-0054460

(51) Int. Cl.
*H04N 21/472* (2011.01)
*H04H 60/72* (2008.01)
(Continued)

(52) U.S. Cl.
CPC ...... *H04N 21/47202* (2013.01); *H04H 60/72* (2013.01); *H04N 21/237* (2013.01); *H04N 21/4345* (2013.01); *H04N 21/44008* (2013.01)

(58) Field of Classification Search
CPC ........... H04N 21/47202; H04N 21/237; H04N 21/4345; H04N 21/44008; H04H 60/72
See application file for complete search history.

(56) References Cited

U.S. PATENT DOCUMENTS

| 7,451,468 | B2 | 11/2008 | Yoon |
| 9,503,778 | B2 | 11/2016 | Kitazato |
| (Continued) | | | |

FOREIGN PATENT DOCUMENTS

| KR | 10-0651468 B1 | 11/2006 |
| KR | 10-2015-0045918 A | 4/2015 |
| (Continued) | | |

OTHER PUBLICATIONS

Chattopadhyay, T. et al., "TV Video Context Extraction", TENCON 2011—IEEE Region 10 Conference, IEEE, Nov. 21, 2011, pp. 216-220, XP032092491. (5 pages total).

(Continued)

*Primary Examiner* — Sumaiya A Chowdhury
(74) *Attorney, Agent, or Firm* — Sughrue Mion, PLLC

(57) ABSTRACT

An electronic apparatus that receives broadcasting schedule information and a content signal corresponding to a channel, provides (e.g., displays or causes to be displayed) an image and/or sound based on the received content signal corresponding to the channel, acquire feature information from the content signal while the image is being provided, and transmit a request for content information corresponding to the acquired feature information to a server. The processor may further include one of: based on identifying that the broadcasting schedule information is incorrect, transmit the request to the server at a first frequency, or based on identifying that the broadcasting schedule information is correct, transmit the request to the server at a second frequency that is different from the first frequency (e.g., lower than the first frequency).

20 Claims, 10 Drawing Sheets

(51) Int. Cl.
*H04N 21/237* (2011.01)
*H04N 21/434* (2011.01)
*H04N 21/44* (2011.01)

(56) References Cited

U.S. PATENT DOCUMENTS

| | | |
|---|---|---|
| 9,516,365 B2 | 12/2016 | Moon et al. |
| 2002/0162118 A1* | 10/2002 | Levy ............... H04N 7/088 725/110 |
| 2005/0086682 A1 | 4/2005 | Burges et al. |
| 2011/0099571 A1* | 4/2011 | Lucas ............. H04N 21/40 725/19 |
| 2012/0321125 A1 | 12/2012 | Choi et al. |
| 2014/0130092 A1* | 5/2014 | Kunisetty ........ H04N 21/4828 725/40 |
| 2016/0127759 A1* | 5/2016 | Jung ............... G06F 16/7834 725/19 |
| 2016/0198200 A1 | 7/2016 | Choi |
| 2017/0134809 A1 | 5/2017 | An et al. |
| 2017/0142474 A1 | 5/2017 | Kitazato et al. |
| 2017/0251248 A1 | 8/2017 | Lee et al. |
| 2017/0272836 A1 | 9/2017 | Chen |
| 2018/0035149 A1 | 2/2018 | Choi et al. |
| 2018/0063558 A1* | 3/2018 | Stefanidis ........ H04N 21/8358 |

FOREIGN PATENT DOCUMENTS

| | | |
|---|---|---|
| KR | 10-2016-0085076 A | 7/2016 |
| KR | 10-2017-0026484 A | 3/2017 |
| KR | 10-1778530 B1 | 9/2017 |
| WO | 2015178218 A1 | 11/2015 |

OTHER PUBLICATIONS

International Search Report (PCT/ISA/210) dated Jul. 12, 2019 by the International Searching Authority in counterpart International Patent Application No. PCT/KR2019/004174.
Written Opinion (PCT/ISA/237) dated Jul. 12, 2019 by the International Searching Authority in counterpart International Patent Application No. PCT/KR2019/004174.
Search Report dated Aug. 7, 2019 by the European Patent Office in counterpart European Patent Application No. 19169881.0.
Communication dated Mar. 27, 2020, from the European Patent Office in counterpart European Application No. 19169881.0.

* cited by examiner

FIG. 7

| CH. | Flag |
|-----|------|
| 1 | 0 |
| 2 | X |
| ⋮ | ⋮ |

ELECTRONIC APPARATUS AND CONTROLLING METHOD THEREOF

CROSS-REFERENCE TO RELATED APPLICATION(S)

This application is based on and claims priority under 35 U.S.C. § 119(a) from Korean Patent Application No. 10-2018-0054460, filed on May 11, 2018, in the Korean Intellectual Property Office, the disclosure of which is incorporated by reference herein in its entirety.

BACKGROUND

1. Field

The disclosure relates to an electronic apparatus and a controlling method thereof. More particularly, the disclosure relates to an electronic apparatus and controlling method which are capable of reducing a frequency of transmitting network requests for content recognition to a server, thereby reducing a networked computer system's processing load.

2. Description of Related Art

As users' needs are becoming more and more diversified, sources of broadcasting contents or multimedia contents are being changed from a single source focused mainly on public broadcasting to various sources, such as, cable broadcasting, Internet Protocol TV (IPTV) and Video on Demand (VOD). In addition, sources providing information like customized recommendations have appeared (e.g., program recommendations, product recommendations).

Such information like customized product or program recommendation needs to be provided appropriately to suit a scene that is currently being output. For example, it is most effective that a message for a specific product be displayed when a scene exposing the specific product is displayed. Accordingly, a technology for recognizing what content a user is currently viewing is needed. Also, a content recognition technology is needed not only for customized delivery, but also for viewing rate surveys, and/or viewing pattern surveys, and the like.

For this, technologies that enable a client apparatus to recognize a content by transmitting a request for recognizing a content that is currently being viewed to a server, and receiving a response thereto from the server have appeared. An Automatic Contents Recognition (ACR) technology using fingerprints is a representative example of these technologies.

However, there is a problem in these recognition technologies, which is that a request needs to be transmitted to a server every time a content that is currently being viewed in real time is to be recognized, and there are substantial amounts of reduction in terms of network performance and high burdens in terms of costs (e.g., memory processing load requirements) that are incurred due to these repeated transmitted requests.

SUMMARY

The disclosure is for addressing the aforementioned problem(s). Accordingly, the disclosure is aimed at providing an electronic apparatus which is capable of reducing a frequency of transmitting a request for content recognition to a server, and a controlling method thereof.

An electronic apparatus according to an embodiment of the disclosure for achieving the aforementioned purpose includes a communication interface, a memory storing computer executable instructions, and a processor configured to, by executing the computer executable instructions, receive broadcasting schedule information and a content signal corresponding to a channel selected by a user through the communication interface, provide at least one of an image or sound based on the received content signal (e.g., by controlling a display to display the image), acquire feature information from the content signal while the image is being provided, and control the communication interface to transmit a request for content information corresponding to the acquired (extracted) feature information to a server. The control of the communication interface may further include at least one of: based on identifying that the broadcasting schedule information for the channel is incorrect, controlling the communication interface to transmit the request to the server at a first frequency, or based on identifying that the broadcasting schedule information for the selected channel is correct, controlling the communication interface to transmit the request to the server at a second frequency, which is different from the first frequency (e.g., lower than the first frequency). Further, the content signal corresponding to the channel may be a content signal corresponding to a channel selected by a user.

In this case, the processor may receive content information from the server through the communication interface in response to the transmitting of the request to the server, and compare the received content information with the received broadcasting schedule information, and thereby, based on the comparing of the received content information with the broadcasting schedule information, identify whether the broadcasting schedule information for the channel is correct.

The processor may acquire a name of a program included in the provided image by, for example, acquiring the name of the program, using optical character recognition (OCR), and compare the acquired program name with the broadcasting schedule information, and based on the comparing of the acquired program name with the broadcasting schedule information, thereby identify whether the broadcasting schedule information for the selected channel is correct. For example, the broadcasting schedule information may be identified as being correct, based on the acquired program name matching the program name of the channel in the received broadcasting schedule information.

Further, the processor may compare the content information received from the server in response to transmitting of the request to the server at the second frequency, which may be lower than the first frequency, with the broadcasting schedule information, and if, as a result of the comparing of the broadcast schedule information with the acquired or extracted feature information, the broadcasting schedule information for the selected channel is identified to be incorrect, control the communication interface to transmit the request to the server at the first frequency.

Also, when a time in the broadcasting schedule information that a particular type of content (e.g., an advertisement for a specific product recommendation, or a recommended program) is expected to be broadcast on the selected channel based on the broadcasting schedule information while transmitting the request to the server at the second frequency, which may be lower than the first frequency, the processor may control the communication interface to transmit the request to the server at a third frequency, which may be higher than the first frequency.

In this case, when a time in the broadcast schedule information comes that that the particular type of content is expected to end on the channel (e.g., a selected channel) based on the broadcasting schedule information while transmitting the request to the server at a frequency, which is higher than the first frequency, the processor may control the communication interface to transmit the request to the server at the second frequency, which may be lower than the first frequency.

Meanwhile, if it is identified that the broadcasting schedule information for the selected channel is incorrect, the processor may control the communication interface to transmit information indicating that the broadcasting schedule information is incorrect to an external server which provided the broadcasting schedule information.

Also, the processor may provide a program guide user interface (UI) corresponding to the broadcasting schedule information, and if it is identified that the broadcasting schedule information for the selected channel is incorrect, provide a UI element notifying that the program information for the selected channel is incorrect in the program guide UI.

Further, the processor may provide a program guide UI corresponding to the broadcasting schedule information, and if it is identified that the broadcasting schedule information for the selected channel is incorrect, correct the program information for the selected channel in the program guide UI based on the content information received from the server in response to transmission of the request to the server.

Also, if the channel is changed while transmitting the request to the server at the second frequency, which may be lower than the first frequency, the processor may control the communication interface to transmit the request to the server at the first frequency.

Meanwhile, the feature information may be at least one of an audio fingerprint or a video fingerprint acquired (e.g., extracted) from the content signal.

A method of controlling an electronic apparatus according to an embodiment of the disclosure includes the steps of receiving broadcasting schedule information and a content signal corresponding to a channel (e.g., a channel selected by a user), providing an image based on a content signal corresponding to the channel (e.g., by displaying (or causing to be displayed) the image of a content signal corresponding to a channel selected by the user), acquiring feature information from the content signal while the image is being provided (e.g., by feature extraction), and transmitting a request for content information corresponding to the acquired feature information to a server. Meanwhile, in the transmitting step, at least one of the following may occur: if it is identified that the broadcasting schedule information for the selected channel is incorrect, the request is transmitted to the server at a first frequency, or if it is identified that the broadcasting schedule information for the selected channel is correct, the request is transmitted to the server at a second frequency that is different from the first frequency (e.g., the second frequency may be lower than the first frequency).

In this case, the method of controlling an electronic apparatus according to an embodiment of the disclosure may further include the steps of receiving content information from the server in response to the transmitting of the request to the server, comparing the received content information with the broadcasting schedule information, and based on the comparing of the received content information with the broadcasting schedule information, thereby identifying whether the broadcasting schedule information for the selected channel is correct.

In addition, the method of controlling an electronic apparatus according to an embodiment of the disclosure may further include the steps of acquiring the name of the program included in the provided image by using optical character recognition (OCR), and comparing the acquired program name with the broadcasting schedule information, and thereby identifying whether the broadcasting schedule information for the selected channel is correct.

Meanwhile, in the transmitting step, the content information received from the server in response to the transmitting of the request to the server at the second frequency, which may be lower than the first frequency may be compared with the broadcasting schedule information, and if, as a result of the comparing, it is identified that the broadcasting schedule information for the selected channel is incorrect, the request may be transmitted to the server at the first frequency.

Also, in the transmitting step, when it is time that a particular type of content (e.g., a product recommendation advertisement or a recommended program) is expected to be broadcast on the channel based on the broadcasting schedule information while the request is being transmitted to the server at a frequency which is lower than the first frequency, the request may be transmitted to the server at a frequency which is higher than the first frequency.

In this case, in the transmitting step, when it is time that the particular type of content is expected to end on the channel based on the broadcasting schedule information while the request is being transmitted to the server at a frequency which is higher than the first frequency, the request may be transmitted to the server at a frequency which is lower than the first frequency.

Meanwhile, the method of controlling an electronic apparatus according to an embodiment of the disclosure may further include the step of, based on the identifying that the broadcasting schedule information for the channel is incorrect, transmitting information indicating that the broadcasting schedule information is incorrect to an external server which provided the broadcasting schedule information.

Also, the method of controlling an electronic apparatus according to an embodiment of the disclosure may further include the steps of providing a program guide user interface (UI) corresponding to the broadcasting schedule information, and based on identifying that the broadcasting schedule information for the channel is incorrect, providing a UI element indicating that the program information for the channel is incorrect in the program guide UI.

Further, the method of controlling an electronic apparatus according to an embodiment of the disclosure may further include the steps of providing a program guide UI corresponding to the broadcasting schedule information, and based on identifying that the broadcasting schedule information for the channel is incorrect, correcting the program information for the channel in the program guide UI based on the content information received from the server in response to transmission of the request to the server.

BRIEF DESCRIPTION OF THE DRAWINGS

FIG. 7 is a diagram for illustrating a matching table indicating whether the broadcasting schedule information of each channel is correct according to an embodiment of the disclosure;

DETAILED DESCRIPTION

Figure 1:
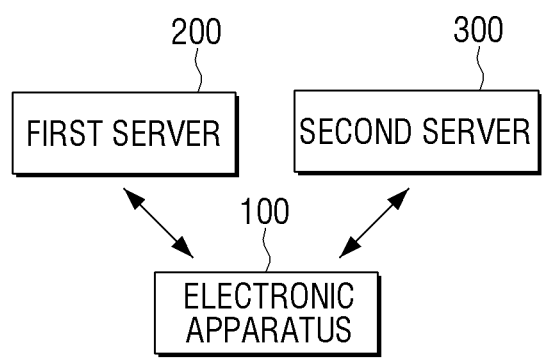
FIG. 1 is a diagram for illustrating a content recognition system according to an embodiment of the disclosure.

Hereinafter, embodiments of the disclosure will be described with reference to the accompanying drawings. Meanwhile, it should be noted that the embodiments are not for limiting the technology described in the disclosure to a specific embodiment, but they should be interpreted to include modifications, equivalents and/or alternatives of the embodiments described in the disclosure. Also, with respect to the detailed description of the drawings, similar components may be designated by similar reference numerals.

In the disclosure, terms such as "have," "may have," "include" or "may include" should be construed as denoting that there are such characteristics (e.g., elements such as numerical values, functions, operations or components), and the terms are not intended to exclude the existence of additional characteristics.

Also, in the disclosure, the expressions "A or B," "at least one of A and/or B," "at least one of A and B" "one or more of A and/or B," "one or more of A and B" and the like may include all possible combinations of the listed items. For example, "A or B," "one or more of A and B," "one or more of A and B," "at least one of A and B" or "at least one of A or B" refer to all of the following cases: (1) including at least one A, (2) including at least one B or (3) including at least one A and at least one B.

Further, the terms "first," and "second" and the like used in the disclosure may use corresponding elements regardless of importance or order and are used to distinguish an element from another element without limiting the elements. That is, the terms "first" and "second" and the like may be used to describe elements regardless of any order and/or degree of importance. For example, a first user device and a second user device may refer to user devices that are different from each other or devices that are similar (e.g., a similar type of device), regardless of any order or degree of importance. Accordingly, a first element may be called a second element, and a second element may be called a first element in a similar manner, without departing from the scope of the disclosure.

Meanwhile, the terms "a module," "a unit," or "a part," or the like used in the disclosure are for referring to elements performing at least one or more functions or operations, and these elements may be implemented as hardware or software, or as a combination of hardware and software. Further, a plurality of "modules," "units," "parts," and the like may be integrated into at least one module or chip and implemented as at least one processor, except when each of them has to be implemented as individual, specific hardware.

In addition, the description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through an intervening element (e.g., a third element). In contrast, the description that one element (e.g., a first element) is "directly coupled" or "directly connected" to another element (e.g., a second element) can be interpreted to mean that an intervening element (e.g., a third element) does not exist between the one element and the another element.

Further, the expression "configured to" used in the disclosure may be interchangeably used with other expressions such as "suitable for," "having the capacity to," "designed to," "adapted to," "made to" or "capable of," depending on cases. Meanwhile, the term "configured to (or set to)" does not necessarily mean that a device is "specifically designed to" in terms of hardware. Instead, under some circumstances, the expression "a device configured to" may mean that the device "is capable of" performing an operation together with another device or component. For example, the phrase "a processor configured to (or set to) perform A, B and C" may mean a dedicated processor (e.g., an embedded processor) for performing the corresponding operations, or a generic-purpose processor (e.g., a central processing unit (CPU) or an application processor) that can perform the corresponding operations by executing one or more software programs stored in at least one memory device.

Meanwhile, the terms used in the disclosure are only used to explain certain embodiments of the disclosure, and are not intended to limit the scope of the other embodiments. Also, singular expressions may include plural expressions, unless defined obviously differently in the context. The terms used in the disclosure, including technical or scientific terms, may have meanings identical to those generally known to those of ordinary skill in the art described in the disclosure. Terms defined in general dictionaries among the terms used herein may be interpreted to have the same meaning as or a similar meaning to the contextual meaning in the related art. Unless otherwise defined, the terms used herein may not be interpreted to have an ideal or overly formal meaning. In some cases, even terms defined herein may not be interpreted to exclude the embodiments herein.

An electronic apparatus according to embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical instrument, a camera, or a wearable device. Meanwhile, according to embodiments of the disclosure, a wearable device may include at least one of an accessory-type device (e.g., a watch, a ring, a bracelet, an ankle bracelet, a necklace, glasses, a contact lens, or a head-mounted-device (HMD)), a device integrated with fabrics or clothing (e.g., electronic clothing), a body-attached device (e.g., a skin pad or a tattoo), or an implantable circuit.

Also, in some embodiments, an electronic apparatus may be a home appliance. A home appliance may include at least one of, for example, a television, a digital video disk (DVD)

player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Samsung One Connect Box™, Apple TV™, or Google TV™), a game console (e.g., Xbox™, PlayStation™), an electronic dictionary, an electronic key, a camcorder, or an electronic photo frame.

In another embodiment of the disclosure, an electronic apparatus may include at least one of various types of medical instruments (e.g., various types of portable medical measurement instruments (e.g., a blood glucose meter, a heart rate meter, a blood pressure meter, or a thermometer, etc.), magnetic resonance angiography (MRA), magnetic resonance imaging (MRI), computed tomography (CT), a photographing device, or an ultrasonic instrument, etc.), a navigation device, a global navigation satellite system (GNSS), an event data recorder (EDR), a flight data recorder (FDR), a vehicle infotainment device, an electronic device for vessels (e.g., a navigation device for vessels, a gyrocompass, etc.), avionics, a security device, a head unit for a vehicle, an industrial or household robot, an automatic teller's machine (ATM) of a financial institution, a point of sales (POS) of a store, or an Internet of things (IoT) device (e.g., a light bulb, various types of sensors, an electronic or gas meter, a sprinkler device, a fire alarm, a thermostat, a street light, a toaster, exercise equipment, a hot water tank, a heater, or a boiler, etc.).

In still another embodiment of the disclosure, an electronic apparatus may include at least one of a part of furniture or a building/a structure, an electronic signature receiving device, a projector, or various types of measurement apparatuses (e.g., water, electricity, gas, or radio wave measurement apparatuses, and the like). In embodiments of the disclosure, an electronic apparatus may be a combination of one or more of the aforementioned various types of apparatuses. Meanwhile, an electronic apparatus according to an embodiment of the disclosure may be a flexible electronic apparatus. Also, an electronic apparatus according to an embodiment of the disclosure is not limited to the aforementioned apparatuses, and may include a new electronic apparatus according to development of technologies.

Hereinafter, the disclosure will be described in detail with reference to the accompanying drawings.

FIG. 1 is a diagram for illustrating a system according to an embodiment of the disclosure.

As shown in FIG. 1, the system according to an embodiment of the disclosure may include an electronic apparatus (100), a first server (200) and a second server (300).

The system of the embodiment is a system that is capable of recognizing a content that was provided through the electronic apparatus (100) and that is being viewed by a user, and providing services related to the recognized content. To perform this recognition, the system may use an ACR technology. An ACR technology refers to a technology of recognizing a content that is being viewed by a user by acquiring(extracting) feature information (or a signature, such as a fingerprint) of the content.

Some examples of purposes of recognizing a content are performing a viewing rate survey, providing personalized services based on a user's viewing pattern, or providing additional services related to a recognized content, and the like.

Meanwhile, feature information of a content is information that enables identification of the content. Examples of feature information include text appearing in the image, a watermark of the image or a fingerprint of the image (e.g., a digital fingerprint), although feature information not limited thereto.

A watermark is data that is inserted into a content signal and enables identification of a content, and it may be inserted into a content signal in an invisible form, or in the form of a visible logo, and the like.

A fingerprint may be intrinsic data for a video or audio in some sections of a content, and it may enable identification of a content as it reflects the intrinsic features of a signal itself. A video fingerprint acquired from a video signal may be information indicating features such as the motion vector and the color of an image signal, and an audio fingerprint acquired from an audio signal may be information indicating features such as the frequency and the amplitude of an audio signal.

Meanwhile, feature information is different from metadata, in that it reflects the features of a content signal itself, unlike metadata that is based on text.

The electronic apparatus (100) may acquire feature information from a content signal corresponding to an image that is being viewed by a user, such as, by feature extraction, and transmit a request (or a query) including the information to the first server (200) (e.g., an ACR server). A front-end, intervening server may exist between the first server (200) and the electronic apparatus (100), although not shown in FIG. 1.

The first server (200) may construct a database of feature information by acquiring feature information from a content signal provided by a content source, and tagging content information to the feature information. Content information may be content identification information that enables identification of a content, and may include at least one of, for example, a content identifier (ID) (or a program ID), the name of the content (or the name of a program) or Electronic Program Guide (EPG) metadata.

Then, the first server (200) may provide a response corresponding to the request received from the electronic apparatus (100) to the electronic apparatus (100). The first server (200) may search feature information corresponding to the feature information received from the electronic apparatus (100) in the database of feature information, and provide a response including content information corresponding to the searched feature information (or content information tagged to the searched feature information) to the electronic apparatus (100).

The response that the first server (200) provides to the electronic apparatus (100) may include not only content information, but also additional service information corresponding to the feature information. Additional service information may be, for example, a real time news article related to a person appearing in the content, information recommending one or more movies where the person appeared as a main character, and/or information on an advertisement of a product included in the content. Additional service information may include at least one of, for example, one or more additional service images, one or more addresses of servers providing one or more additional services, one or more routes for acquiring one or more additional service, one or more addresses for one or more additional services, one or more starting times of one or more additional services, one or more ending times of one or more additional services, one or more lifetimes of additional services or descriptions of additional services.

The electronic apparatus (100) may recognize a content that is currently being viewed by transmitting a request including feature information to the first server (200) periodically, and receiving a response corresponding to the request. As the interval at which the electronic apparatus (100) transmits a request to the first server (200) becomes shorter, the accuracy of content recognition can be improved further. However, there is a problem that it costs a lot of network and computer resources to transmit a request. Meanwhile, if the interval becomes longer, the cost can be saved, but there is a problem that the accuracy of content recognition is reduced.

To complement such problems, the electronic apparatus (100) may use broadcasting schedule information acquired from the second server (300) (or a metadata server). Broadcasting schedule information may include information related to broadcasting programs of each channel (e.g., program IDs, program names, and the like), and information on broadcasting hours of broadcasting programs. Also, broadcasting schedule information may be EPG metadata. The electronic apparatus (100) may identify which broadcasting program is being broadcast on the channel currently selected based on broadcasting schedule information.

However, broadcasting schedule information provided by the second server (300) is not always correct. For example, there may be a case where broadcasting proceeds according to a schedule which is different from the schedule set in advance, due to the circumstance of the broadcasting station, and this is not reflected at the second server (300). As another example, there may be a case where the user of the electronic apparatus (100) sets the region incorrectly, and the electronic apparatus (100) is provided with the broadcasting schedule information of another region which is not the region where the electronic apparatus (100) is actually installed. Also, for various reasons other than the above cases, the broadcasting schedule information provided by the second server (300) cannot be fully trusted.

Accordingly, an aspect of the disclosure is aimed at recognizing a content accurately while saving the cost, by using an effective method for content recognition that is based on both of feature information of the image (e.g., extracted feature information) and based on broadcasting schedule information.

According to an embodiment of the disclosure for achieving the aforementioned purpose, if it is identified that the broadcasting schedule information received from the second server (300) is incorrect, the electronic apparatus (100) may transmit a request for content information corresponding to feature information (i.e., a request including feature information) to the first server (200) at a first frequency, and if it is identified that the broadcasting schedule information is correct, the electronic apparatus (100) may transmit the request to the first server (200) at a frequency which is lower than the first frequency. Here, the first frequency may be an arbitrary frequency, and it may be a frequency that is set as a default or a frequency set by a user. For example, the first frequency may be a frequency of transmitting a request once per minute.

Hereinafter, the electronic apparatus (100) will be described in more detail with reference to FIG. 2.

Figure 2:
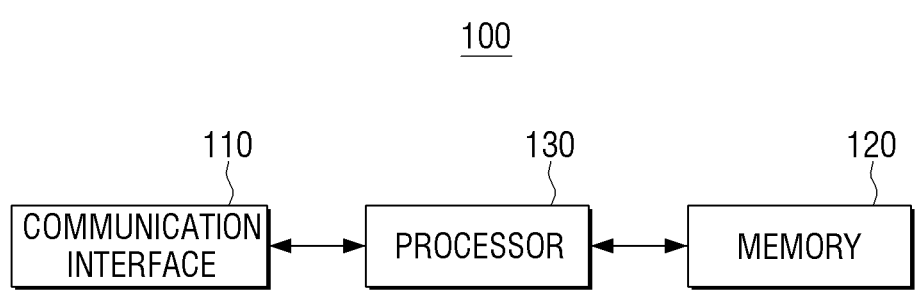
FIG. 2 is a block diagram for illustrating a configuration of an electronic apparatus according to an embodiment of the disclosure.

FIG. 2 is a diagram for illustrating a configuration of an electronic apparatus (100) according to an embodiment of the disclosure.

Referring to FIG. 2, the electronic apparatus (100) may include a communication interface (110), one or more memories (120), and one or more processors (130). Also, appropriate hardware/software elements of an obvious level to those skilled in the art may additionally be included in the electronic apparatus (100) that are not shown according to the embodiments.

The electronic apparatus (100) may be an apparatus that is capable of receiving a content signal and providing an image and/or audio based on the content signal by itself, or providing them through another electronic apparatus connected to the electronic apparatus (100). For example, the at least one processor may provide at least one of an image or sound based on the received content signal corresponding to a channel selected by a user by controlling a display of the electronic apparatus or transmitting information to cause an external separate display to display the image. For example, the electronic apparatus (100) may be a television (TV), a set-top box, or a smart TV box (e.g., Samsung HomeSync™, Samsung One Connect Box™, Apple TV™, or Google TV™), or the like.

The communication interface (110) may be connected to a network through wireless communication or wired communication, and communicate with an external apparatus. For example, the communication interface (110) may communicate with an external apparatus through communication methods such as infrared Data Association (IrDA), Radio Frequency Identification (RFID), Near Field Communication (NFC), Wireless Fidelity (WiFi), ultra wideband (UWB), WirelessDisplay (WiDi), WirelessHD (WiHD), Wireless Home Digital Interface (WHDI), Miracast, Wireless Gigabit Alliance (Wigig), Wi-Fi Direct, Bluetooth (e.g., Bluetooth Classic, Bluetooth Low Energy), AirPlay, Z-wave, 4LoWPAN, LTE D2D, GPRS, Weightless, Edge Zigbee, Digital Living Network Alliance (DLNA), ANT+, Digital Enhanced Cordless Telecommunications (DECT), wireless local area network (WLAN), Global System for Mobile communications (GSM), Universal Mobile Telecommunication System (UMTS), or Long-Term Evolution (LTE), Wireless Broadband (WiBRO), or the like.

The one or more memories (120) may include, for example, at least one of: a built-in memory or an external memory. A Built-in memory may include at least one of, for example, volatile memory (e.g., a dynamic random access memory (RAM) (DRAM), a static RAM (SRAM), or a synchronous dynamic RAM (SDRAM), etc.) or non-volatile memory (e.g., a one time programmable read only memory (ROM) (OTPROM), programmable ROM (PROM), erasable and programmable ROM (EPROM), electrically erasable and programmable ROM (EEPROM), mask ROM, flash ROM, flash memory (e.g., Not-And (NAND) flash or Not-Or (NOR) flash, etc.), a hard drive, or a solid state drive (SSD)).

External memory may include a flash drive, for example, compact flash (CF), secure digital (SD), micro secure digital (Micro-SD), mini secure digital (Mini-SD), extreme digital (xD), a multi-media card (MMC) or a memory stick, or the like. Also, external memory may be functionally and/or physically connected to the electronic apparatus (100) through various types of interfaces.

Meanwhile, the memory (120) may be accessed by the processor (130), and reading/recording/correction/deletion/update, etc. of data by the processor (130) may be performed.

In the disclosure, the term memory may refer to memory that is provided separately from the processor (130), or ROM (not shown) or RAM (not shown) inside the processor (130).

The processor (130) may be an element for controlling the overall operations of the electronic apparatus (100). For example, the processor (130) may operate an operation system or an application program, and may thereby control a plurality of hardware or software elements connected to the processor (130), and perform various types of data processing and operations. The processor (130) may be a central processing unit (CPU) or a graphics-processing unit (GPU), or both. Also, the processor (130) may be implemented as at least one general hardware processor, a digital signal processor, an Application specific integrated circuit (ASIC), a system on chip (SoC), or a Microcomputer (MICOM), or the like. Further, the processor (130) may perform operations of the electronic apparatus (100) according to the embodiments of the disclosure by executing one or more computer executable instructions stored in the at least one memory (120).

The processor (130) may provide an image and/or sound based on a content signal. The content signal may be a Radio Frequency (RF) broadcasting signal, a digital video recorder (DVR) content signal, a VoD/OTT Non-linear content signal or a UGC content signal.

While an image and/or sound is being provided, the processor (130) may acquire feature information from a content signal (e.g., by feature extraction), and control the communication interface (110) to transmit a request for content information corresponding to the acquired feature information to the first server (200). The feature information may be at least one of an audio fingerprint, a video fingerprint or a watermark acquired(extracted) from the content signal.

Then, the processor (130) may receive content information corresponding to the acquired(extracted) feature information from the first server (200) through the communication interface (110) in response to the transmitting of the request.

Also, the processor (130) may transmit the request to the first server (200) periodically while an image and/or sound is being provided. For example, in a case where an interval of transmission is set as 1 minute, the processor (130) may acquire feature information at the set interval of 1 minute during reproduction of an image and transmit the request to the first server (200), and in accordance therewith, recognize which image scene is being provided at an interval of every 1 minute.

The interval of transmission of a request as described above (or request interval frequency) may be adjusted or set according to circumstances. For example, the processor (130) may receive broadcasting schedule information from the second server (300) through the communication interface (110), and if it is identified that the broadcasting schedule information for the channel selected by the user is incorrect, the processor (130) may control the communication interface (110) to transmit the request to the first server (200) at a first frequency, and if it is identified that the broadcasting schedule information for the selected channel is correct, the processor (130) may control the communication interface (110) to transmit the request to the first server (200) at a second frequency that is different from the first frequency. For example, the second frequency may be is lower than the first frequency.

Here, the channel selected by the user may be the channel of broadcasting received through a tuner of the electronic apparatus (100), or the channel of broadcasting provided by an external apparatus (e.g., an IP set-top box) connected to the electronic apparatus (100). In the case of the former, the processor (130) may acquire the number of the channel currently selected by identifying the tuned channel, and in the case of the latter, the processor (130) may acquire the number of the channel by transmitting a signal requesting the number of the channel to an external apparatus (and receiving a response indicating the channel), or acquiring the number of the channel included in the image by using OCR.

Also, the processor (130) may acquire the number of the channel currently selected, and identify whether the broadcasting schedule information for the channel currently selected is correct. Identifying whether the broadcasting schedule information for the channel currently selected is correct may be performed through various types of methods.

According to an embodiment of the disclosure, the processor (130) may receive content information from the first server (200) through the communication interface (110) in response to transmission of the request to the first server (200), and compare the received content information with the broadcasting schedule information, and thereby identify whether the broadcasting schedule information for the channel currently selected is correct.

According to another embodiment of the disclosure, the processor (130) may acquire the name of the program included in the image that is currently being provided by using OCR (e.g., OCR feature extraction), and compare the acquired (or extracted) program name with the broadcasting schedule information, and thereby identify whether the broadcasting schedule information for the channel currently selected is correct.

According to still another embodiment of the disclosure, the processor (130) may recognize a logo included in the image that is currently being provided by comparing the logo with a database storing images of various logos, and compare the channel name or the broadcasting station corresponding to the recognized logo with the broadcasting schedule information, and thereby identify whether the broadcasting schedule information for the channel currently selected is correct.

According to another embodiment of the disclosure, there is a method of receiving confirmation from a user on whether the broadcasting schedule information is correct. For example, the processor (130) may generate a User Interface (UI) inquiring to the user based on the broadcasting schedule information. The processor (130) may generate a UI including text such as "Is the program you are currently watching is 'XXX'?" based on the name of the program that is programmed for the channel number currently selected in the broadcasting schedule information, and a UI element for receiving a response to the inquiry, and provide the UI. Then, based on a user input through the UI, the processor (130) may identify whether the broadcasting schedule information for the channel currently selected is correct.

An operation of identifying whether broadcasting schedule information is correct may be performed only once for one channel, or performed several times on one channel. Alternatively, an operation of identifying whether broadcasting schedule information is correct may be performed when a specific event occurs. A specific event may include, for example, an event where the channel is changed, an event where a new program starts or an event where a new broadcasting schedule information is received, or an event where a request for confirming whether broadcasting schedule information is correct is received from a user.

Figure 7:
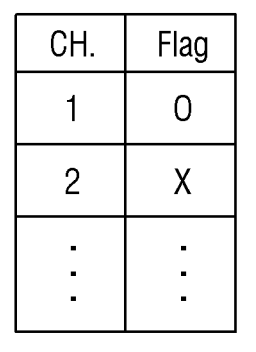

The processor (130) may generate a matching table indicating whether the broadcasting schedule information of each channel is correct. An example of the matching table is illustrated in FIG. 7. The matching table may be updated according to an operation of identifying whether broadcasting schedule information is correct.

Meanwhile, according to an embodiment of the disclosure, whether broadcasting schedule information is correct may be notified to a user. For example, the processor (130) may provide a program guide UI (or EPG) corresponding to broadcasting schedule information. The processor (130)

may provide a program guide UI through the display of the electronic apparatus (100), or an external display apparatus connected to the electronic apparatus (100). Further, if it is identified that the broadcasting schedule information for the channel currently selected is incorrect, the processor (130) may provide a UI element indicating (or notifying) that the program information for the specific channel is incorrect in the program guide UI. In addition, the processor (130) may provide a UI element indicating (or notifying) that the program information is incorrect, based on the matching table generated or updated. The embodiment as above will be described in more detail with reference to FIG. 8 below.

Also, according to an embodiment of the disclosure, the processor (130) may not just notify to a user that the broadcasting schedule information is incorrect, but may also correct an incorrect portion to be accurate.

For example, the processor (130) may provide a program guide UI corresponding to broadcasting schedule information, and if it is identified that the broadcasting schedule information for a specific channel is incorrect, the processor (130) may correct the program information on the specific channel in the program guide UI based on the content information received from the first server (200) in response to transmission of a request including feature information to the first server (200). That is, in the program guide UI that is provided after identifying that the broadcasting schedule information is incorrect, the incorrect portion has been corrected. Accordingly, the program guide UI may be displayed differently from a program guide UI that was previously provided.

If it is identified that the broadcasting schedule information for a specific channel is incorrect, the processor (130) may control the communication interface (110) to transmit information notifying that the broadcasting schedule information is incorrect to the second server (300) that provided the broadcasting schedule information. That is, as a feedback that the broadcasting schedule information is incorrect is given to the second server (300), the second server (300) may correct the broadcasting schedule information.

Further, the processor (130) may receive content information from the first server (200) in response to transmission of the request to the first server (200) at a frequency which is lower than the first frequency as it was identified that the information on the broadcasting program for the channel currently selected is correct. Then, the processor (130) may compare the received content information with the broadcasting schedule information, and if, as a result of the comparing, it is identified that the broadcasting schedule information for the selected channel is incorrect, control the communication interface (110) to transmit the request to the first server (200) at the first frequency. That is, if it is identified that broadcasting schedule information is correct, and then it is identified again that the broadcasting schedule information is incorrect, the interval of transmission is reduced.

Meanwhile, more precise content recognition is necessary while a short particular type of content (e.g., a short advertisement) is being broadcast. Thus, it is necessary to transmit a request to the first server (200) at a shorter interval. For this, according to an embodiment of the disclosure, when it is time that the particular type of content (e.g., the commercial advertisement or the short advertisement) is expected to be broadcast on the channel currently selected based on the broadcasting schedule information while the processor (130) is transmitting the request to the first server (200) at a frequency which is lower than the first frequency, the processor (130) may control the communication interface (110) to transmit the request to the first server (200) at a frequency (a third frequency) which is higher than the first frequency. In this regard, the time that is within the predetermined time range from the ending or starting time of a program in the broadcasting schedule information may be regarded as the time that the particular type of content (e.g., the advertisement) is expected to be broadcast.

When a particular type of content (e.g., a commercial an advertisement) ends and a broadcasting program starts again, a request is transmitted at the original interval. Accordingly, when it is time that a particular type of content (e.g., a commercial an advertisement) is expected to end on the selected channel based on the broadcasting schedule information while the processor (130) is transmitting the request to the first server (200) at a frequency which is higher than the first frequency, the processor (130) may control the communication interface (110) to transmit the request to the first server (200) at a frequency which is lower than the first frequency. In this regard, the time that is within the predetermined time range from the ending or starting time of a program in the broadcasting schedule information may be regarded as the time that a particular type of content (e.g., a commercial an advertisement) is expected to end.

Figure 3:
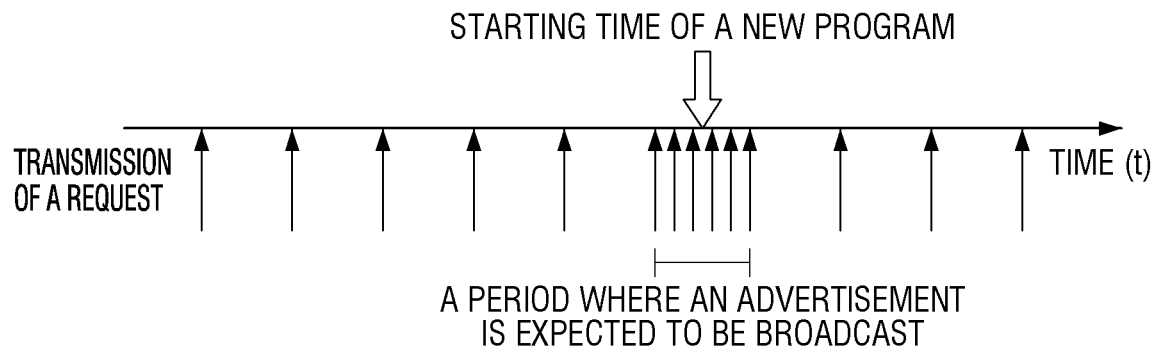
FIG. 3 is a diagram for illustrating embodiments of the disclosure wherein frequencies of requests for content recognition to a server are controlled.

For example, as illustrated in FIG. 3, the time between xx minute before a new program starts and xx minute after the program starts in the broadcasting schedule information may be identified as the period when a particular type of content (e.g., a commercial advertisement) is expected to be broadcast, and the frequency of transmission of a request in this period may be made to be higher.

Figure 4:
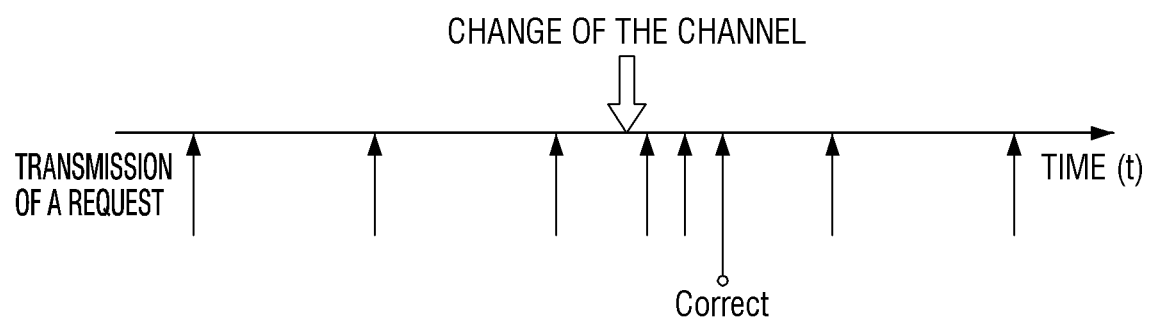
FIG. 4 is a diagram for illustrating embodiments of the disclosure wherein frequencies of requests for content recognition to a server are controlled.

Meanwhile, in a situation where it has not been identified whether broadcasting schedule information is correct, the processor (130) may transmit the request to the first server (200) at the first frequency. For example, as illustrated in FIG. 4, when the channel changes while the processor (130) is transmitting the request to the first server (200) at a frequency which is lower than the first frequency, it is necessary to identify whether the broadcasting schedule information for the changed channel is correct. Accordingly, the processor (130) may control the communication interface (110) to transmit the request to the first server (200) at the first frequency. Whether the channel has been changed may be identified by checking, for example, whether an instruction for channel tuning has been received, whether a specific UI (e.g., a banner) has been displayed which is provided when the channel changes, or whether the logo of the broadcasting station that was displayed has changed, etc. If it is identified that the broadcasting schedule information is correct (a correct point) after the channel changes, as illustrated in FIG. 4, the processor (130) may control the communication interface (110) to transmit the request to the first server (200) at a frequency which is lower than the first frequency again.

Figure 5:
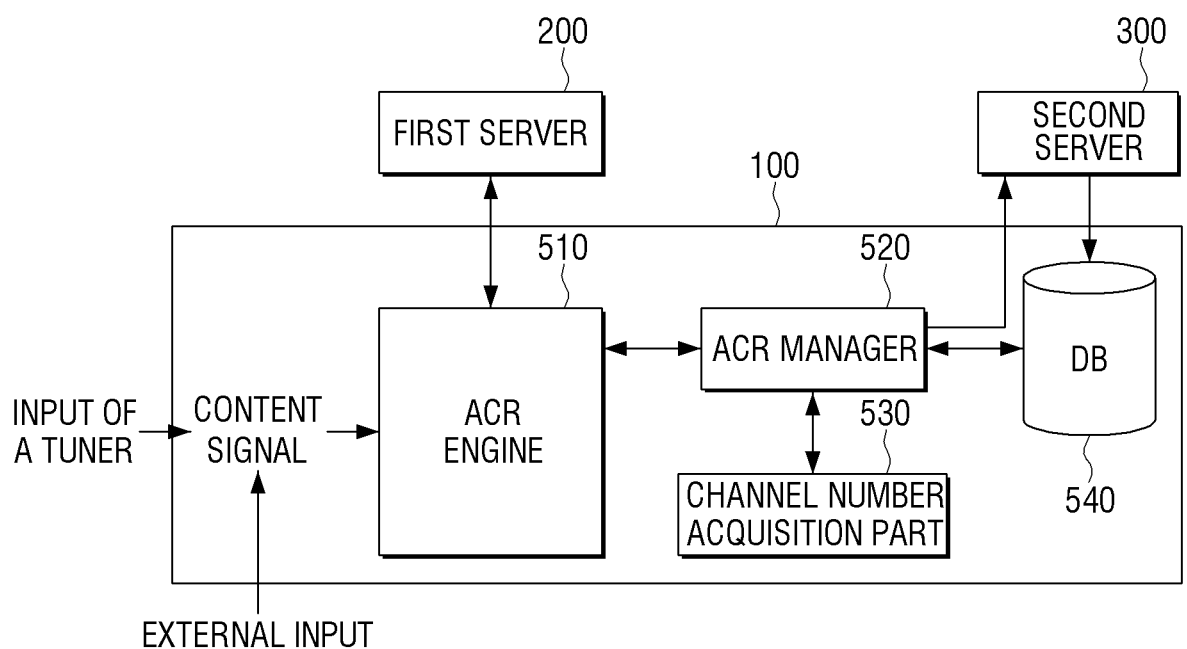
FIG. 5 is a conceptual diagram of an electronic apparatus according to an embodiment of the disclosure.

FIG. 5 is a conceptual diagram of an electronic apparatus (100) according to an embodiment of the disclosure.

As illustrated in FIG. 5, the electronic apparatus (100) in the conceptual diagram according to an embodiment of the disclosure may include an ACR engine (510), an ACR manager (520), a channel number acquisition part (530) and a broadcasting schedule information database (540). At least one of the ACR engine (510), the ACR manager (520) and the channel number acquisition part (530) may be implemented as a portion of the processor (130) or by being integrated with the processor (130). The broadcasting schedule information database (540) may be included in the at least one memory (120). Communication between the first server (200) and the second server (300) and the electronic apparatus (100) may be performed through the communication interface (110).

The ACR engine (510) may capture a content signal (an audio signal and/or a video signal) that is input as a tuner input or an external input (HDMI, HDMI dongle, etc.) and generate an audio sample or a video sample, acquire feature information such as a fingerprint from the generated audio sample or video sample, transmit a request including the feature information to the first server (200), and receive a response including content information (e.g., a program ID) from the first server (200).

The broadcasting schedule information database (540) may store broadcasting schedule information received from the second server (300). In case it is identified that the broadcasting schedule information is incorrect, the information may be corrected by the ACR manager (520). Also, in case the broadcasting schedule information is incorrect, the ACR manager (520) may provide a feedback in this regard to the second server (300).

The channel number acquisition part (530) is a feature for acquiring the number of the channel currently selected. The channel number acquisition part (530) may acquire the number of the channel currently selected through various types of methods.

As an example, in case a user is viewing an image based on an RF broadcasting content signal, the channel number acquisition part (530) may acquire the number of the channel currently tuned.

As another example, in case a user is viewing an image based on a content signal received from a content providing apparatus (e.g., a set-top box) connected through an external input (e.g., HDMI), the channel number acquisition part (530) may receive the number of the channel by requesting the number of the current channel to the content providing apparatus. In this case, the channel number acquisition part (530) may acquire the number of the channel by using a communication method supported by the electronic apparatus (100) and the content providing apparatus. For example, communication methods such as ZigBee and WiFi may be used.

As still another example, the channel number acquisition part (530) may identify that the channel has changed if a specific UI (e.g., a banner) that is displayed when the channel changes is detected. Also, the channel number acquisition part (530) may acquire the number of the channel by sniffing an IR remote control signal that controls the content providing apparatus when the channel changes, and analyzing the sniffed remote control signal.

As another example, the channel number acquisition part (530) may acquire the number of the channel by recognizing the number of the channel included in the image that is currently being viewed (e.g., the number of the channel included in the banner of the screen) through OCR.

Meanwhile, the ACR manager (520) may control the frequency at which the ACR engine (510) transmits a request to the first server (200) according to whether the broadcasting schedule information received from the second server (300) is correct.

According to an embodiment of the disclosure, the ACR manager (520) may acquire broadcasting schedule information from the broadcasting schedule information database (540), and identify whether the broadcasting schedule information for the channel currently selected is correct based on the content information provided from the ACR engine (510) and the number of the channel provided from the channel number acquisition part (530).

For example, based on the number of the channel provided from the channel number acquisition part (530) and the content information provided from the ACR engine (510), it may be identified that the current user is viewing the program 'Big Bang' that is being broadcast on channel No. 1. Also, if, according to the broadcasting schedule information, 'Big Bang' is currently programmed on channel No. 1, it may be identified that the broadcasting schedule information for channel No. 1 is correct. In contrast, if, according to the broadcasting schedule information, another program which is not 'Big Bang' is currently programmed on channel No. 1, it may be identified that the broadcasting schedule information for channel No. 1 is incorrect. Here, a case of comparing program names is suggested as an example, but there may also be a case of comparing program IDs.

If it is identified that the broadcasting schedule information for the channel currently selected is incorrect, the ACR manger (520) may control the ACR engine (510) to transmit a request including feature information to the first server (200) at the first frequency. Accordingly, the ACR engine (510) may transmit requests including feature information to the first server (200) while making the interval of transmission as a first interval corresponding to the first frequency. For example, the first interval may be set as 1 minute.

Meanwhile, if it is identified that the broadcasting schedule information for the channel currently selected is correct, the ACR manger (520) may control the ACR engine (510) to transmit a request including feature information to the first server (200) at a frequency which is lower than the first frequency. Accordingly, the ACR engine (510) may transmit requests including feature information to the first server (200) while making the interval of transmission as a second interval which is longer than the first interval. For example, the second interval may be set as 10 minutes.

According to another embodiment of the disclosure, the electronic apparatus (100) may identify whether broadcasting schedule information is correct by itself, even if there is no help from the first server (200). For example, the processor (130) may acquire the number of the channel, the name of the program, etc. that is currently being viewed by applying a character recognition technology such as OCR to the image that is currently being provided, and compare the information with the broadcasting schedule information, and thereby identify whether the broadcasting schedule information is correct. This embodiment will be described with reference to FIG. 6.

Figure 6:
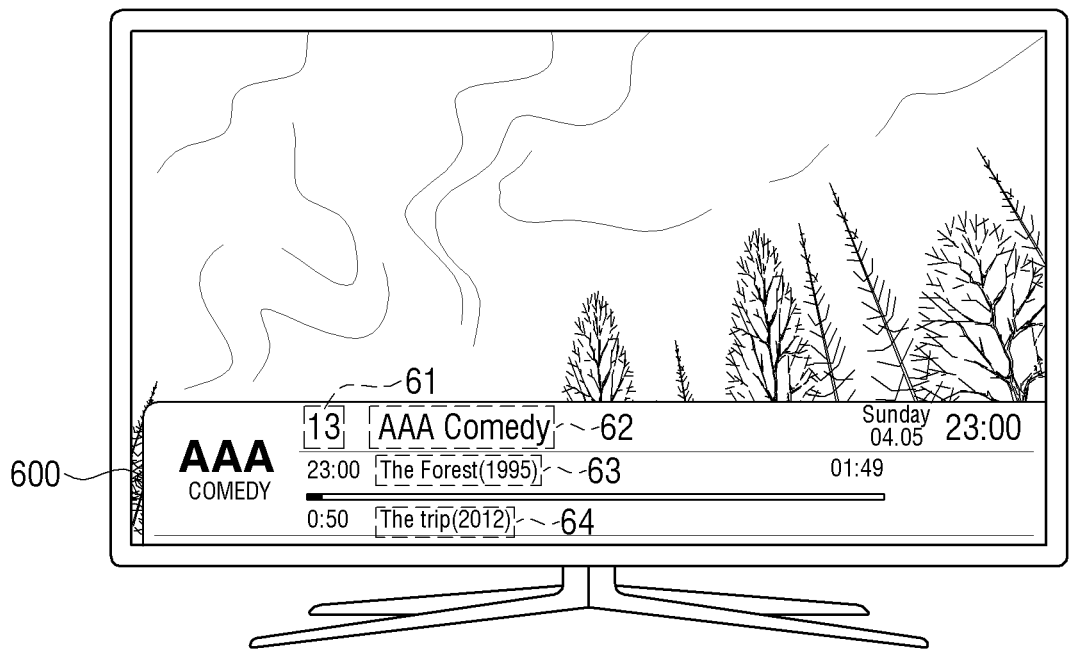
FIG. 6 is a diagram for illustrating an embodiment of the disclosure wherein it is identified whether broadcasting schedule information is correct.

Referring to FIG. 6, in case a banner (600) is included in the image that is currently being viewed, the processor (130) may recognize the text included in the banner (600) by an OCR method, and thereby acquire the number of the channel and the name of the program that is currently being viewed. For example, the processor (130) may check whether an image corresponding to a pre-stored banner image is being displayed in the at least one memory (120), and if, as a result of checking, it is determined that a banner exists in the image, the processor (130) may perform OCR. The banner (600) may include various types of information such as the number of the channel (61), the name of the channel (62), the name of the current program (63), the name of the next program (64), and the like. Meanwhile, the at least one memory (120) may store information on a region for which OCR needs to be performed in advance.

The processor (130) may identify whether the broadcasting schedule information for the current channel is correct, by comparing the number of the channel (61) and the name of the program (63) acquired by an OCR method as above with the name of the program that is currently programmed on the number of the channel (61). Meanwhile, it is also possible to compare them with the name of the next program (64). Then, the processor (130) may control the frequency at which a request including feature information is transmitted to the first server (100), based on the result of identification.

By a method as described above, the processor (130) may prepare a matching table indicating whether the broadcasting schedule information of each channel is correct. For example, as illustrated in FIG. 7, if the broadcasting schedule information of each channel is correct, the processor (130) may record "0" as a flag value, and if the broadcasting schedule information is incorrect, the processor (130) may record "X." The matching table may be updated in real time. Also, the matching table may be integrated with the broadcasting schedule information.

Meanwhile, according to an embodiment of the disclosure, whether broadcasting schedule information is correct may be notified to a user. For example, the processor (130) may provide a program guide UI (or EPG) corresponding to broadcasting schedule information. Further, if it is identified that the broadcasting schedule information for a specific channel is incorrect, the processor (130) may provide a UI element notifying that the program information for the specific channel is incorrect in the program guide UI. In addition, the processor (130) may provide a UI element notifying that the program information is incorrect, based on the matching table generated.

Figure 8:
FIG. 8 is a diagram for illustrating an embodiment of the disclosure wherein a user is notified of whether broadcasting schedule information is correct.

FIG. 8 is a diagram for illustrating an UI provided by the electronic apparatus (100) according to an embodiment of the disclosure.

Referring to FIG. 8, the processor (130) may provide a program guide UI (800) corresponding to broadcasting schedule information. For a channel that is identified as incorrect in the broadcasting schedule information, a UI element (82) notifying that the program information is incorrect may be provided (such as an 'X' image), as illustrated in FIG. 8. Meanwhile, for a channel that is identified as correct in the broadcasting schedule information, the processor (130) may provide a UI element (81) notifying that the program information is correct (such as an checkmark image), as illustrated in FIG. 8. With respect to channels for which it has not been identified whether information is correct, a UI element may not be provided, or another UI element indicating that it has not been identified whether the information is correct may be provided.

Figure 9:
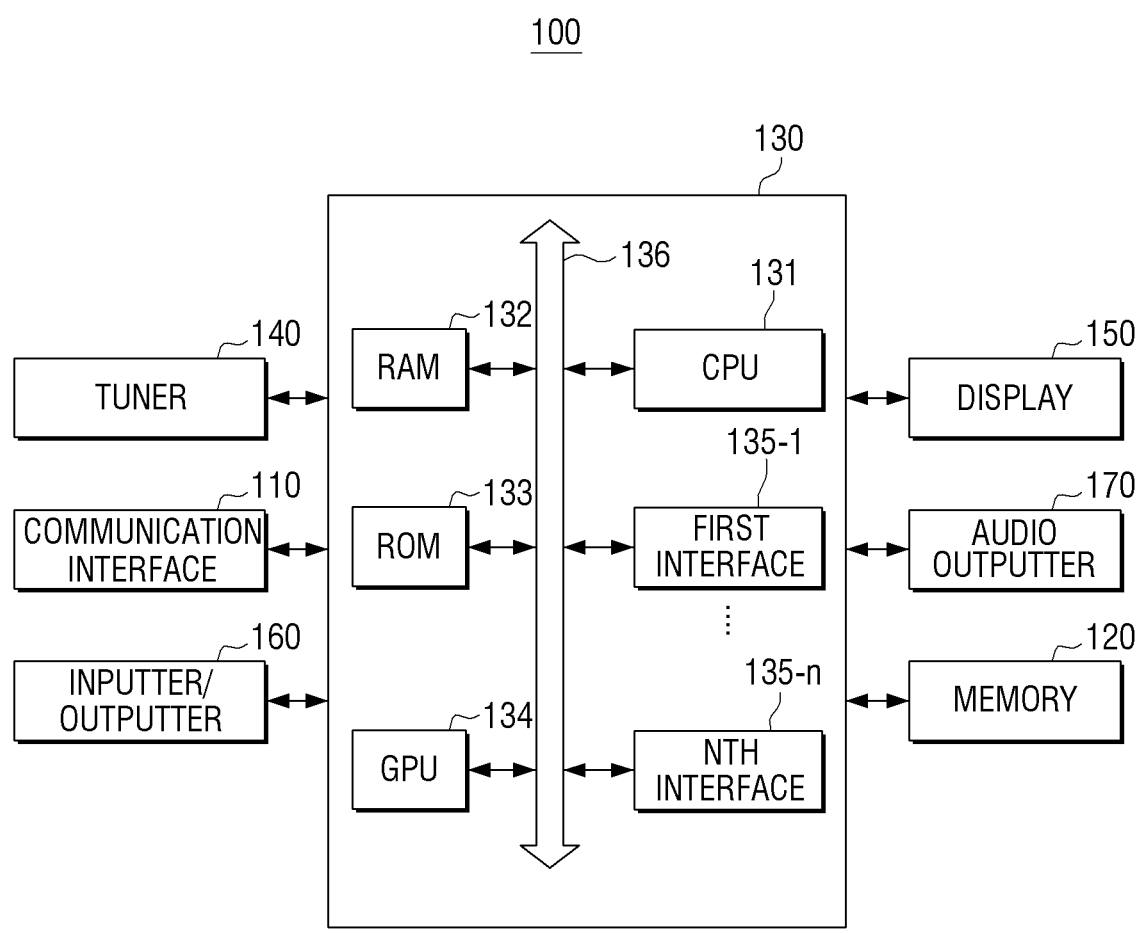
FIG. 9 is a detailed block diagram for illustrating a configuration of an electronic apparatus according to an embodiment of the disclosure.

FIG. 9 is a block diagram for illustrating a configuration of an electronic apparatus (100) according to another embodiment of the disclosure.

Referring to FIG. 9, the electronic apparatus (100) may include a communication interface (110), at least one memory (120), a processor (130), a tuner (140), a display (150), an inputter/outputter (160) and an audio outputter (170). Depending on embodiments, some of the above elements may be omitted. Also, appropriate hardware/software elements of an obvious level to those skilled in the art may additionally be included in the electronic apparatus (100), although they are not shown.

The communication interface (110) is a feature for performing communication with an external apparatus. For description of the communication interface (110) illustrated in FIG. 9, the description of the communication interface (110) made with reference to FIG. 2 may be referred to.

The at least one memory (120) may store various types of data and an OS for driving and controlling the electronic apparatus (100). For description of the at least one memory (120) illustrated in FIG. 9, the description of the at least one memory (120) made with reference to FIG. 2 may be referred to.

The tuner (140) may select a broadcasting signal that is received through wire or wirelessly by tuning only the frequency of the channel that is to be received at the electronic apparatus (100) among numerous radio wave components through amplification, mixing, resonance, etc.

Also, the tuner (140) may receive a broadcasting signal including video, audio and/or additional data in a frequency band corresponding to the channel selected by a user.

In addition, the tuner (140) may receive a broadcasting signal from various types of sources such as ground radio wave broadcasting, cable broadcasting or satellite broadcasting. Alternatively, the tuner (140) may receive a broadcasting signal from sources such as analogue broadcasting or digital broadcasting.

Meanwhile, a broadcasting signal received through the tuner (140) may include at least one of video data, audio data and/or metadata, which is information related to a program. Metadata may include additional information for a broadcasting program, for example, at least one of the names of the program, the plot of the program, the starting time of broadcasting, and the ending time of broadcasting, and the like. Also, metadata which is information related to a broadcasting program may be received from an Internet server through the communication interface (110), as well as through the tuner (140).

The tuner (140) may be implemented as an all-in-one with the electronic apparatus (100), or as a separate apparatus electrically connected to the electronic apparatus (100) (e.g., a tuner connected to the inputter/outputter (160) or the communication interface (110)).

The display (150) may be a feature for displaying an image, and may output, for example, video data included in a broadcasting signal received through the tuner (140), an image input through the communication interface (110) or the inputter/outputter (160), or an image included in the image file stored in the at least one memory (120).

The display (150) may be implemented as, for example, a Liquid Crystal Display (LCD), and depending on cases, it may also be implemented as a cathode-ray tube (CRT), a plasma display panel (PDP), organic light emitting diodes (OLEDs), a transparent OLED (TOLED), and the like. Also, the display (150) may be implemented in the form of a touch screen that is capable of detecting a touch manipulation of a user.

The audio outputter (170) is a feature for outputting audio, and may output, for example, audio included in a broadcasting signal received through the tuner (140), audio input through the communication interface (110) or the inputter/outputter (160), or audio included in the audio file stored in the at least one memory (120). Also, the audio outputter (170) may include a speaker and/or a headphone output terminal.

The inputter/outputter (160) is a feature for being connected to an external apparatus, and may include at least one of, for example, a High-Definition Multimedia Interface (HDMI) port, a component input jack, a USB port, and the like. Other than the above elements, the inputter/outputter (160) may also include at least one of ports such as RGB, DVI, DP, thunderbolt, and the like.

Meanwhile, the processor (130) may control the overall operations of the electronic apparatus (100). For description of the processor (130) illustrated in FIG. 9, the description of the processor (130) made with reference to FIG. 2 may be referred to.

The processor (130) may include RAM (132), ROM (133), a GPU (134), a CPU (131), first to $n^{th}$ interfaces (135-1~135-n) and a bus (136), as illustrated in FIG. 9. Here, the RAM (132), ROM (133), GPU (134), CPU (131) and first to $n^{th}$ interfaces (135-1~135-n) may be connected with one another through the bus (136).

The ROM (133) may store a set of one or more instructions, etc. for system booting. When a turn-on instruction for the electronic apparatus (100) is input and power is supplied, the CPU (131) may copy the OS stored in the at least one memory (120) in the RAM (132) according to the instruction stored in the ROM (133), and boot the system by executing the OS. When booting is completed, the CPU (131) may copy the various types of programs stored in the at least one memory (120) in the RAM (132), and perform various types of operations by executing the programs copied in the RAM (132). The CPU (131) may perform various types of operations by using the various types of program modules, data, etc. stored in the at least one memory (120).

When booting of the electronic apparatus (100) is completed, the GPU (134) may display an image. The GPU (134) may generate a screen including various types of objects such as icons, images and text by using an operation part and a rendering part. The operation part may operate attribute values like coordinate values, forms, sizes and colors with which each of the objects will be displayed according to the layout of the screen. The rendering part may generate screens in various layouts including objects, based on the attribute values operated at the operation part. The screens generated at the rendering part may be provided to the display (150), and displayed in the display area.

As shown in FIG. 9, the first to $n^{th}$ interfaces (135-1~135-n) may be connected to the aforementioned various types of elements (110, 120 and 140 to 170). One of the interfaces may be a network interface that is connected with an external apparatus through a network.

The processor (130) may capture a content signal that is input through the tuner (140) or the inputter/outputter (160) and thereby acquire (or extract) feature information such as a fingerprint, and control the communication interface (110) to transmit a request for content information corresponding to the acquired feature information to the first server (200).

Also, the processor (130) may use the broadcasting schedule information received from the second server (300), in order to reduce the cost for transmitting a request. The processor (130) may acquire the number of the channel currently selected, and identify whether the broadcasting schedule information for the channel currently selected is correct.

In order to identify whether the broadcasting schedule information is correct, the processor (130) may acquire the number of the channel, the name of the channel, the channel call sign, the name of the program, and the like included in the image that is currently being displayed on the display (150) through OCR.

As another example, in order to identify whether the broadcasting schedule information for the channel currently selected is correct, the processor (130) may transmit a request including acquired (extracted) feature information on an image that is currently being displayed on the display (150) to the first server (200).

In this case, the processor (130) may transmit the request while including information that designates a range to be searched first at the first server (200). For example, the processor (130) may include information on the program (e.g., the name of the program, the program ID, etc.) that is scheduled for the channel currently selected in the broadcasting schedule information as well as feature information in the request, and transmit the request to the first server (200). Then, the first server (200) may perform search from the feature information of a specific program based on the information included in the received request. If the broadcasting schedule information is correct, the speed of search at the first server (200) could be improved.

Meanwhile, if the broadcasting schedule information is incorrect, the processor (130) may notify this to a user. The processor (130) may, for example, control the display (150) to display a program guide UI corresponding to the broadcasting schedule information, and if it is identified that the information of a specific channel in the broadcasting schedule information is incorrect, the processor (130) may control the display (150) to display a UI element indicating that the information for the channel is incorrect on the program guide UI. That is, a UI as illustrated in FIG. 8 may be provided, for example, through the display (150). Further, the processor (130) may control the interval of transmission of a request to the first server (200), according to whether broadcasting schedule information is correct. To be specific, if it is identified that the broadcasting schedule information for the channel currently selected is incorrect, the processor (130) may control the communication interface (110) to transmit a request including feature information such as a fingerprint to the first server (200) at the first frequency. Meanwhile, if it is identified that the broadcasting schedule information for the selected channel is correct, the processor (130) may control the communication interface (110) to transmit the request to the first server (200) at a frequency which is lower than the first frequency.

Various types of services may be provided based on recognition of a content based on content information received in response to transmission of a request to the first server (200), or correct broadcasting schedule information. As an example, a user's viewing pattern may be identified, and services that are customized to suit the user's viewing pattern may be provided. As another example, additional service information related to the recognized content may be provided. For example, the processor (130) may control the display (150) to display additional content (e.g., an advertisement), or other useful information, etc. related to the recognized content by virtually overlaying them on the image that is currently being provided. Additional service data may be provided through a separate server, or may be provided through the first server (200). The first server (200) may transmit additional service information while transmitting content information to the electronic apparatus (100) in response to a request including feature information. As still another example, in case a content is recognized as an advertisement, the processor (130) may provide a content which is not an advertisement (e.g., a substitutional advertisement, etc.).

Figure 10:
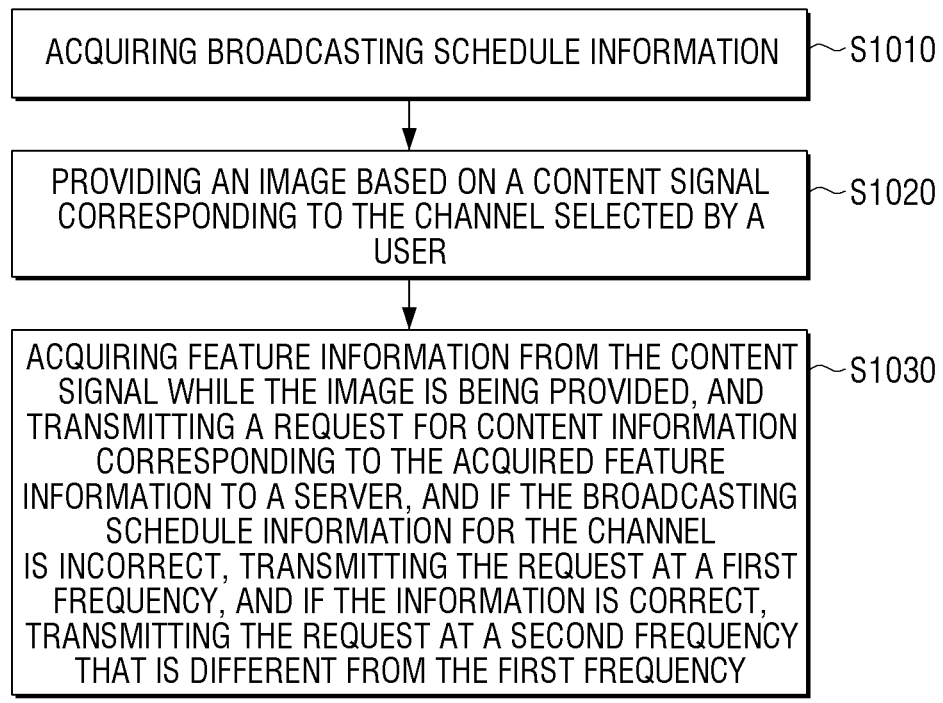
FIG. 10 is a flow chart for illustrating a method of controlling an electronic apparatus according to an embodiment of the disclosure.

FIG. 10 is a diagram for illustrating a method of controlling an electronic apparatus according to an embodiment of the disclosure. The flow chart illustrated in FIG. 10 may consist of operations that are processed at the electronic apparatus (100) described in this specification. Accordingly, the content described with respect to the electronic apparatus (100) may also be applied to the flow chart illustrated in FIG. 10, even if the content is omitted below.

Referring to FIG. 10, the electronic apparatus (100) may acquire broadcasting schedule information (S1010). The broadcasting schedule information may be provided from an external server. The electronic apparatus may also receive a content signal corresponding to a channel, such as, a channel selected by a user.

The electronic apparatus (100) may provide an image based on a content signal corresponding to the channel (S1020). For example, the electronic apparatus may cause a display to display an image based on the received content signal corresponding to the channel selected by the user. The order of step S1010 and step 1020 is not set, and the broadcasting schedule information may be acquired while an image is being provided or after an image is provided.

Then, the electronic apparatus (100) may acquire feature information from the content signal while the image is being provided, and transmit a request for content information corresponding to the acquired feature information to a server. Meanwhile, if it is identified that the broadcasting schedule information for the selected channel is incorrect, the electronic apparatus (100) may transmit the request to the server at the first frequency. Alternatively, if it is identified that the broadcasting schedule information for the channel is correct, the electronic apparatus (100) may transmit the request to the server at a frequency that is different from the first frequency, such as, a frequency which is lower than the first frequency (S1030). For example, the electronic apparatus may acquire(extract) feature information from the image, and cause the communication interface to transmit a request for content information corresponding to the acquired(extracted) feature information to a server. In an embodiment, the transmitting may comprise: based on identifying that the broadcasting schedule information for the selected channel is incorrect, transmitting the request to the server at a first frequency, or based on identifying that the broadcasting schedule information for the selected channel is correct, transmitting the request to the server at a second frequency, which is lower than the first frequency.

According to a method of controlling an electronic apparatus according to an embodiment of the disclosure, the electronic apparatus (100) may receive content information from the server in response to transmission of the request to the server, and compare the received content information with the broadcasting schedule information, and thereby identify whether the broadcasting schedule information for the selected channel is correct.

According to another embodiment of the disclosure, the electronic apparatus (100) may acquire the name of the program included in the provided image by using OCR, and compare the acquired program name with the broadcasting schedule information, and thereby identify whether the broadcasting schedule information for the selected channel is correct.

Meanwhile, according to a method of controlling an electronic apparatus according to an embodiment of the disclosure, the electronic apparatus (100) may receive content information from the server in response to transmission of the request to the server at a frequency which is lower than the first frequency as it was identified that the broadcasting schedule information for the selected channel is correct. Then, the electronic apparatus (100) may compare the received content information with the broadcasting schedule information, and if, as a result of the comparing, it is identified that the broadcasting schedule information for the selected channel is incorrect, the electronic apparatus (100) may transmit the request to the server at the first frequency.

Also, according to a method of controlling an electronic apparatus according to an embodiment of the disclosure, when it is time that an advertisement is expected to be broadcast on the selected channel based on the broadcasting schedule information while transmitting the request to the server at a frequency which is lower than the first frequency as it was identified that the broadcasting schedule information for the selected channel is correct, the electronic apparatus (100) may transmit the request to the server at a frequency which is higher than the first frequency.

In this case, when it is time that the advertisement is expected to end on the selected channel based on the broadcasting schedule information while transmitting the request to the server at a frequency which is higher than the first frequency, the electronic apparatus (100) may transmit the request to the server at a frequency which is lower than the first frequency.

Further, according to a method of controlling an electronic apparatus according to an embodiment of the disclosure, if it is identified that the broadcasting schedule information for the selected channel is incorrect, the electronic apparatus (100) may transmit information notifying that the broadcasting schedule information is incorrect to an external server which provided the broadcasting schedule information.

Also, according to a method of controlling an electronic apparatus according to an embodiment of the disclosure, the electronic apparatus (100) may provide a program guide UI corresponding to the broadcasting schedule information, and if it is identified that the broadcasting schedule information for the selected channel is incorrect, provide a UI element notifying that the program information for the selected channel is incorrect in the program guide UI.

In addition, according to a method of controlling an electronic apparatus according to an embodiment of the disclosure, the electronic apparatus (100) may provide a program guide UI corresponding to the broadcasting schedule information, and if it is identified that the broadcasting schedule information for the selected channel is incorrect, correct the program information for the selected channel in the program guide UI based on the content information received from the server in response to transmission of the request to the server.

Also, according to a method of controlling an electronic apparatus according to an embodiment of the disclosure, if the channel is changed while transmitting the request to the server at a frequency which is lower than the first frequency, the electronic apparatus (100) may control the communication interface to transmit the request to the server at the first frequency.

According to the aforementioned embodiments of the disclosure, the frequency of transmitting a request including feature information for content recognition can be reduced. Accordingly, there is a benefit that a query cost can be reduced.

The embodiments of the disclosure described above may be implemented as software, hardware or a combination thereof. According to implementation by hardware, the embodiments described in the disclosure may be implemented by using at least one of Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors or an electronic unit for performing various functions. Meanwhile, according to implementation by software, the embodiments such as procedures and functions described in this specification may be implemented as separate software modules. Each of the software modules may perform one or more functions and operations described in this specification.

Also, the embodiments described in the disclosure may be implemented as software including one or more instructions that can be stored in machine-readable storage media, which can be read by machines (e.g., computers). The machines refer to apparatuses that call one or more instructions stored in a storage medium, and can operate according to the called one or more instructions, and the apparatuses may include the electronic apparatus (100) according to the embodiments described in the disclosure. In case an instruction as described above is executed by a processor, the processor may perform a function corresponding to the instruction by itself, or by using other components under its control. An instruction may include a code made by a compiler or a code executable by an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

Also, according to an embodiment of the disclosure, the method according to the embodiments described in the disclosure may be provided while being included in a computer program product. A computer program product refers to a product, and it can be traded between a seller and a buyer. A computer program product can be distributed on-line in the form of a storage medium that is readable by machines (e.g. compact disc read only at least one memory (CD-ROM)), or through an application store (e.g. Play Store™). In the case of on-line distribution, at least a portion of a computer program product may be stored in a storage medium such as the server of the manufacturer, the server of the application store, and the at least one memory of the relay server at least temporarily, or may be generated temporarily.

Further, each of the components according to the aforementioned embodiments (e.g. a module or a program) may consist of a singular object or a plurality of objects. Also, among the aforementioned corresponding sub components, some sub components may be omitted, or other sub components may be further included in the embodiments. Generally or additionally, some components (e.g. a module or a program) may be integrated as an object, and perform the functions that were performed by each of the components before integration identically or in a similar manner. A module, a program, or operations performed by other components according to the embodiments may be executed sequentially, in parallel, repetitively, or heuristically. Or, at least some of the operations may be executed or omitted in a different order, or other operations may be added.

While the disclosure has been shown and described with reference to preferred embodiments thereof, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus, comprising:
   a communication interface;
   a memory storing computer executable instructions; and
   a processor configured to, by executing the computer executable instructions:
   receive broadcasting schedule information through the communication interface and a content signal corresponding to a channel,
   provide an image based on the received content signal corresponding to the channel,
   acquire feature information from the content signal while the image is being provided, and
   control the communication interface to transmit a request for content information corresponding to the acquired feature information to a server,
   wherein the processor controls the communication interface to:
   based on identifying that the broadcasting schedule information for the channel is incorrect, control the communication interface to transmit the request to the server at a first frequency, or
   based on identifying that the broadcasting schedule information for the channel is correct, control the communication interface to transmit the request to the server at a second frequency that is lower than the first frequency.

2. The electronic apparatus of claim 1, wherein the processor is further configured to:
   receive the content information from the server through the communication interface based the transmitted request to the server,
   compare the received content information with the broadcasting schedule information, and
   based on the comparing of the received content information with the broadcasting schedule information, identify whether the broadcasting schedule information for the channel is correct.

3. The electronic apparatus of claim 1, wherein the processor is further configured to:
   acquire a name of a program included in the provided image by using optical character recognition (OCR),
   compare the acquired program name with the broadcasting schedule information, and
   based on the comparing of the acquired program name with the broadcasting schedule information, identify whether the broadcasting schedule information for the channel is correct.

4. The electronic apparatus of claim 1, wherein the processor is further configured to:
   compare the content information received from the server based on the transmitted request to the server at the second frequency, which is lower than the first frequency with the broadcasting schedule information, and based on, as a result of the comparing of the content information and the broadcasting schedule information, the broadcasting schedule information for a selected channel being identified to be incorrect, control the communication interface to transmit the request to the server at the first frequency.

5. The electronic apparatus of claim 1, wherein the processor is further configured to:
   when a time comes that a particular type of content is expected to be broadcast on the channel based on the broadcasting schedule information while transmitting the request to the server at the second frequency which is lower than the first frequency, control the communication interface to transmit the request to the server at a third frequency which is higher than the first frequency.

6. The electronic apparatus of claim 5, wherein the processor is further configured to:
   when a time comes that the particular type of content is expected to end on the channel based on the broadcasting schedule information while transmitting the request to the server at the third frequency, which is higher than the first frequency, control the communication interface to transmit the request to the server at the second frequency, which is lower than the first frequency.

7. The electronic apparatus of claim 1, wherein the processor is further configured to:
based on identifying that the broadcasting schedule information for the channel is incorrect, control the communication interface to transmit information indicating that the broadcasting schedule information is incorrect to an external server which provided the broadcasting schedule information.

8. The electronic apparatus of claim 1, wherein the processor is further configured to:
provide a program guide User Interface (UI) corresponding to the broadcasting schedule information, and based on the identifying that the broadcasting schedule information for the channel is incorrect, provide a UI element indicating that program information for the channel is incorrect in the program guide UI.

9. The electronic apparatus of claim 1, wherein the processor is further configured to:
provide a program guide User Interface (UI) corresponding to the broadcasting schedule information, and
based on the identifying that the broadcasting schedule information for the channel is incorrect, correct program information for the channel in the program guide UI based on the content information received from the server, the received content information being based on the transmitted request to the server.

10. The electronic apparatus of claim 1, wherein the processor is further configured to:
based on the channel being changed while transmitting the request to the server at the second frequency, which is lower than the first frequency, control the communication interface to transmit the request to the server at the first frequency.

11. The electronic apparatus of claim 1, wherein
the providing of the image includes causing a display to display the image, and
the acquired feature information is at least one of an audio fingerprint or a video fingerprint acquired from the content signal.

12. A method of controlling an electronic apparatus, comprising:
receiving broadcasting schedule information and a content signal corresponding to a channel;
causing a display to display an image based on the received content signal corresponding to the channel;
acquiring feature information from the content signal while the image is being provided; and
transmitting a request for content information corresponding to the acquired feature information to a server,
wherein the transmitting comprises:
based on identifying that the broadcasting schedule information for the channel is incorrect, transmitting the request to the server at a first frequency, or
based on identifying that the broadcasting schedule information for the channel is correct, transmitting the request to the server at a second frequency that is lower than the first frequency.

13. The method of controlling an electronic apparatus of claim 12, further comprising:
receiving content information from the server based on the transmitting of the request to the server,
comparing the received content information with the broadcasting schedule information, and
based on the comparing of the received content information with the broadcasting schedule information, identifying whether the broadcasting schedule information for the channel is correct.

14. The method of controlling an electronic apparatus of claim 12, further comprising:
acquiring a name of a program included in the displayed image by using optical character recognition (OCR),
comparing the acquired program name with the broadcasting schedule information, and
based on the comparing of the acquired program name with the broadcasting schedule information, identifying whether the broadcasting schedule information for the channel is correct.

15. The method of controlling an electronic apparatus of claim 12, further comprising:
comparing the broadcasting schedule information with the content information received from the server based on the transmitting of the request to the server at the second frequency, which is lower than the first frequency, and
based on, as a result of the comparing, the broadcasting schedule information for the channel being identified to be incorrect, transmitting the request to the server at the first frequency.

16. The method of controlling an electronic apparatus of claim 12, wherein the transmitting comprises:
when a time comes that a particular type of content is expected to be broadcast on the channel based on the broadcasting schedule information while transmitting the request to the server at the second frequency, which is lower than the first frequency, transmitting the request to the server at a third frequency, which is higher than the first frequency.

17. The method of controlling an electronic apparatus of claim 12, wherein the transmitting comprises:
when a time comes that the particular type of content is expected to end on the channel based on the broadcasting schedule information while transmitting the request to the server at a third frequency, which is higher than the first frequency, transmitting the request to the server at the second frequency, which is lower than the first frequency.

18. The method of controlling an electronic apparatus of claim 12, further comprising: based on the identifying that the broadcasting schedule information for the channel is incorrect, transmitting information indicating that the broadcasting schedule information is incorrect to an external server which provided the broadcasting schedule information.

19. The method of controlling an electronic apparatus of claim 12, further comprising:
providing a program guide user interface (UI) corresponding to the broadcasting schedule information; and
based on the identifying that the broadcasting schedule information for the channel is incorrect, providing a UI element indicating that program information for the channel is incorrect in the program guide UI.

20. The method of controlling an electronic apparatus of claim 12, further comprising:
providing a program guide user interface (UI) corresponding to the broadcasting schedule information; and
based on the identifying that the broadcasting schedule information for the channel is incorrect, correcting program information for the channel in the program guide UI based on the content information received from the server based on the transmitting of the request to the server.

* * * * *